Patented July 11, 1939

2,165,618

UNITED STATES PATENT OFFICE 2,165,618

COMPOUNDS OF THE ANTHRAQUINONE SERIES

William Dettwyler, Milwaukee, Wis., assignor to E. I. du Pont de Nemours & Company, Wilmington, Del., a corporation of Delaware No Drawing. Application July 25, 1935, Serial No. 33,062

1 Claim. (Cl. 260—277)

This invention relates to the preparation of new aroylamino-anthraquinone-2.1(N)-benzacridones which contain the aroylamino group in the 5- or 8-position of the anthraquinone nucleus.

The invention has for its object the preparation of new aroylamino-anthraquinone-2.1-(N)-benzacridone compounds which dye cotton in red shades and which may also be used as intermediates for the preparation of other dyestuffs.

I have found that when 5- or 8-amino-anthraquinone-2.1(N)-benzacridones or a mixture of the two are reacted with acid chlorides of the aromatic series, which includes the heterocyclic carboxylic acid chlorides, new 5- or 8-aroylamino-anthraquinone-2.1(N)-benzacridones are formed which dye cotton from a vat in varying shades of red. These new dyestuffs have excellent fastness properties. Halogenated aminoanthraquinone-2.1(N)-benzacridones, and halogen containing aromatic acid chlorides may also be used, or the aroylamino-anthraquinone-2.1-(N)-benzacridones may be halogenated by known methods after condensation to give dyestuffs having increased tinctorial strength. The halogen containing products also serve as intermediates for the preparation of other compounds.

The condensation of the amino-anthraquinone-2.1(N)-benzacridone and the aromatic acid chloride may be carried out by the methods usually employed for the condensation of anthraquinone amines with organic acid chlorides, preferably in an inert organic solvent.

The following examples are given to illustrate the invention. The parts used are by weight.

Example 1

Suspend 47 parts of 8-amino-anthraquinone-2.1(N)-benzacridone in 400 parts solvent naphtha and heat to 135° C. until all moisture is distilled off; then cool to about 50° C. and add 30 parts of benzoyl chloride, heat to 135° C. and hold at this temperature for 16 hours. Cool, filter and wash the dark red crystal with naphtha. The dry product is a dark red powder, soluble in concentrated sulphuric acid with a yellow brown color and dyes cotton from a violet vat in Bordeaux red shades.

Example 2

Add to 300 parts nitrobenzene 50 parts of 5-amino-anthraquinone-2.1(N)-benzacridone and heat to 160° C. When dehydration is complete, cool to 100° C., add 32 parts of benzoylchloride, heat to 205° C., and hold one hour. Cool to 20° C. and filter off the dark red crystals, wash with nitrobenzene and alcohol and dry. The product consists of dark red crystals, soluble in concentrated sulphuric acid with a yellow-brown color and dyes cotton Bordeaux red shades from a violet vat.

Example 3

Suspend 10 parts 5-amino-anthraquinone-2.1-(N)benzacridone in 250 parts ortho-dichlorobenzene and add 11 parts of anthraquinone-2.1(N)-benzacridone-para-carbonylchloride and heat to 170° C., hold for 3 hours, cool to room temperature, filter and wash. The reaction product consists of a dark red powder soluble in concentrated sulphuric acid with a yellow-brown color and dyes cotton from a violet vat in Bordeaux red shades.

Example 4

Condense 31 parts of 1-chloro-anthraquinone-2-carbonylchloride with 34 parts of 5-aminoanthraquinone-2.1(N)-benzacridone in 500 parts of ortho-dichlorobenzene at 170–175° C. for 2 hours. Cool, filter and wash. The product consists of a dark red powder, soluble in concentrated sulphuric acid with a yellow-brown color and dyes cotton a dull red from a violet vat. A similar shade is obtained when 1.9-anthrathiazol-2-carbonylchloride is used.

Example 5

Suspend 40 parts trichloro-8-amino-anthraquinone-2.1(N)benzacridone (obtained by chlorination of 8-amino-anthraquinone-2.1(N)-benzacridone in chlorosulphonic acid with chlorine gas) in 400 parts dichlorobenzene and add 25 parts benzoylchloride. Heat to 165–170° C. and hold 3 hours. Cool, filter, wash with alcohol and dry.

The product consists of dark red crystals, soluble in concentrated sulphuric acid with a redbrown color and dyes cotton a strong wine-red from a violet vat. This chlorinated product dyes much stronger than the corresponding unchlorinated product.

Example 6

Heat a mixture of 10 parts trichloro-5-amino-anthraquinone-2.1(N)-benzacridone (obtained by chlorination of 5-amino-anthraquinone-2.1(N)-benzacridone in chlorosulphonic acid) and 8 parts anthraquinone-2.1(N)-benzacridone-para-carbonylchloride of the formula

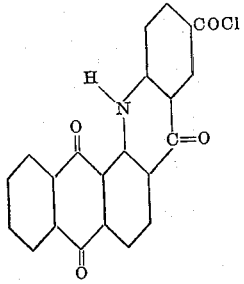

in 250 parts of ortho-dichlorobenzene at 165–175° C. for 2 hours. Cool to 20° C. and filter and wash with dichlorobenzene and alcohol. The dark red product dissolves with a red-brown color in sulphuric acid and dyes cotton a wine-red from a violet vat.

A similar shade is obtained when starting from trichloro-8-amino-anthraquinone-2.1(N)-benzacridone or the corresponding tribromo compounds, or when using the anthraquinone-2.1-(N)-benzacridone-ortho-carbonylchloride.

Example 7

Benzoylate 25 parts 5-amino-anthraquinone-2.1(N)-benzacridone with 16 parts benzoylchloride in 100 parts nitrobenzene for 1 hour at 175° C., cool to 100° C. and add 100 parts acetic acid and 16 parts sodium acetate fused. Pass in chlorine gas until sample contains 24–25% chlorine. Then cool, filter and wash with alcohol and water and dry.

The dyestuff is a dark red powder soluble in concentrated sulphuric acid with a red-brown color and dyes cotton a strong red with blue tint from a blue-violet vat.

Other acid chlorides of the aromatic series may be substituted for those specifically mentioned in the examples, such as: 1-amino-anthraquinone-6-carboxylic acid, 1,9-anthraisoselenazole-2-carbonyl chloride (or the isomeric 4 and 5 carbonyl chloride), anthraquinone-2-carbonyl chloride, 1-benzoylamino-anthraquinone-6-carbonyl chloride, 1-chloro-anthraquinone-6-carbonyl chloride, 1,9-anthraisothiophen-2-carbonyl chloride, α-naphthoyl chloride, β-naphthoyl chloride, m-methoxy-benzoyl chloride, Tere-phthaloyl chloride, m-anisyl chloride, p-nitro-benzoyl-chloride, p-chloro-benzoyl-chloride, anthraquinone-2.1-thiopene-C-carboxylic acid, etc.

I claim:
A compound of the formula

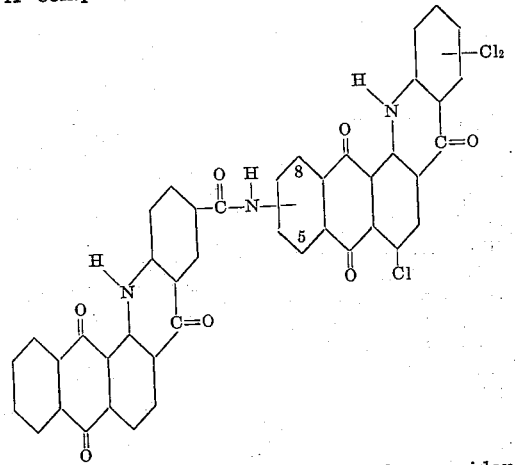

wherein the anthraquinone-2.1(N)-benzacridonoylamine radical is attached in one of the positions 5 and 8.

WILLIAM DETTWYLER.